(12) United States Patent  (10) Patent No.: US 9,308,960 B2
Broussard  (45) Date of Patent: *Apr. 12, 2016

(54) THREADLESS FORK COMPRESSION SYSTEM AND METHOD FOR KICK STYLE SCOOTER

(71) Applicant: Andrew David Broussard, Vista, CA (US)

(72) Inventor: Andrew David Broussard, Vista, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/815,807

(22) Filed: Jul. 31, 2015

(65) Prior Publication Data

US 2015/0360742 A1  Dec. 17, 2015

Related U.S. Application Data

(60) Continuation of application No. 14/168,695, filed on Jan. 30, 2014, which is a division of application No. 12/705,340, filed on Feb. 12, 2010, now Pat. No. 8,657,522.

(51) Int. Cl.
 *B62K 21/04* (2006.01)
 *B62K 21/18* (2006.01)
 *F16B 7/04* (2006.01)

(52) U.S. Cl.
 CPC ............... *B62K 21/18* (2013.01); *F16B 7/0413* (2013.01); *F16B 7/0426* (2013.01); *Y10T 403/551* (2015.01)

(58) Field of Classification Search
 CPC ........ B62K 3/002; B62K 21/04; B62K 21/18; F16B 7/0413
 See application file for complete search history.

(56) References Cited

U.S. PATENT DOCUMENTS

| | | |
|---|---|---|
| 85,465 A | 12/1868 | McKinney |
| 2,640,219 A | 6/1953 | Becker |
| 4,068,965 A | 1/1978 | Lichti |
| 4,111,575 A | 9/1978 | Hoshino |
| 4,217,061 A | 8/1980 | Eiland |
| 5,062,734 A | 11/1991 | Vanzee |
| 5,269,550 A | 12/1993 | Hon |
| 5,400,676 A | 3/1995 | Kao |
| 5,408,900 A | 4/1995 | Marui |
| 5,536,104 A | 7/1996 | Chen |
| 5,605,075 A * | 2/1997 | Chi .............................. 280/279 |
| 5,743,302 A | 4/1998 | McNeely |
| 6,305,869 B1 | 10/2001 | Chen |
| 6,322,092 B1 | 11/2001 | Chen |
| 6,557,878 B2 | 5/2003 | Chen |
| 6,824,471 B2 | 11/2004 | Kamenov |
| 6,892,604 B2 | 5/2005 | Tison |
| 6,908,249 B2 | 6/2005 | Tomm |
| 2002/0121155 A1 | 9/2002 | Wu |
| 2007/0052201 A1 | 3/2007 | Hermansen |

* cited by examiner

*Primary Examiner* — Michael P Ferguson
(74) *Attorney, Agent, or Firm* — Jonathan A. Kidney; TechLaw LLP

(57) ABSTRACT

A compression coupler is described that provides a robust and simple mechanism to couple threadless tubes in bicycles and/or scooters. Particularly, the handlebar/stem tube-to-fork joint is coupled with a compression sleeve. The coupler provides more surface area for binding and is tightened along a slot on the length of the coupler. The coupler can include a headtube bearing preloading mechanism, a keyway for aligning the handlebar/stem tube to the fork, and shims to accommodate different sized tubings.

17 Claims, 7 Drawing Sheets

SECTION A-A

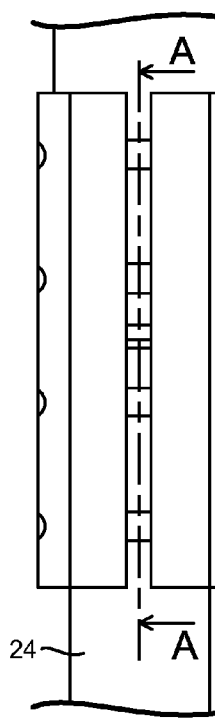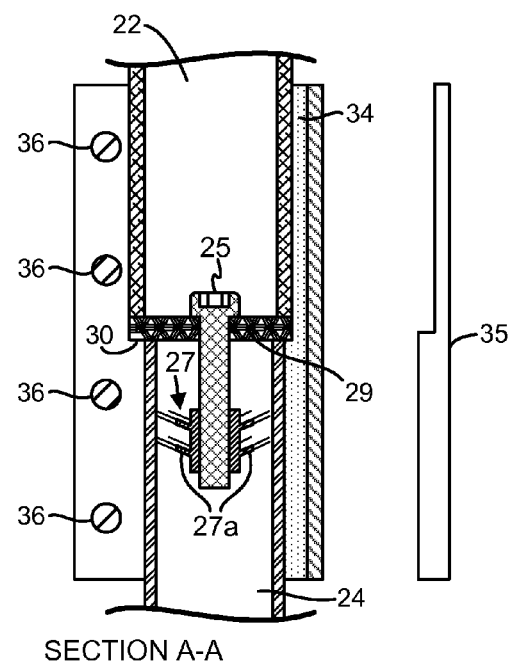
FIG. 3A
FIG. 3B

SECTION A-A

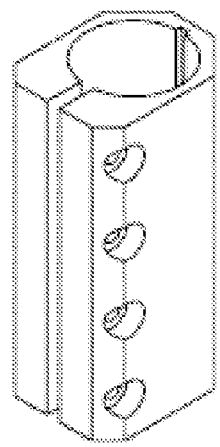
FIG. 6A
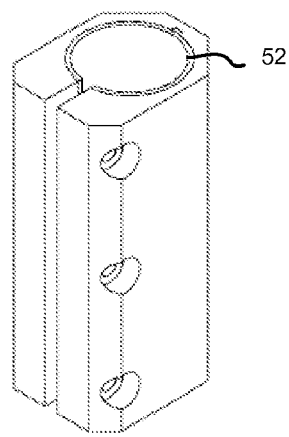 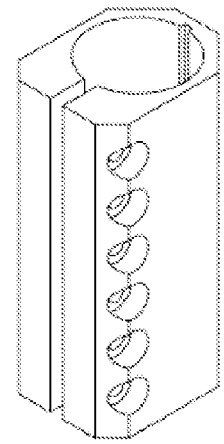
FIG. 6B        FIG. 6C

THREADLESS FORK COMPRESSION SYSTEM AND METHOD FOR KICK STYLE SCOOTER

CROSS-REFERENCE TO RELATED APPLICATION(S)

This application claims the benefit of pending U.S. patent application Ser. No. 14/168,695 filed Jan. 30, 2014, which is a Divisional of issued U.S. Pat. No. 8,657,522 corresponding to U.S. patent application Ser. No. 12/705,340 filed Feb. 12, 2010, the contents of which are hereby incorporated by reference in its entirety.

FIELD

The present disclosure is directed to the field of mechanical couplers for differently sized diameter objects. More particularly, it is directed to a compression based coupler for robustly binding together the handle bar stem and fork tube of a bicycle or kick style scooter.

BACKGROUND

Non-motorized scooters, particularly of the sort typified by kick scooters are rapidly entering competitive circles for stunt performances and other extreme forms of competition. Most popular of the kick scooters is the Razor® scooter. The force of activities on a typical scooter will often result in various parts of the scooter to fail. As can be imagined, because of the inherent danger of these stunts, a failed scooter component can result in serious injury to the rider. Therefore, there has been an increasing interest in ruggedizing various components of the scooter.

One particular area where little attention has been devoted is the joint between the stem of the handle bars and the fork of the front wheel. No one has successfully devised a coupling mechanism that secures the stem-to-fork joint from breaking or severing under extreme loads. In view of this deficiency, various systems and methods are disclosed herein that provide a simple and yet robust solution to the stem-to-fork joint problem for bicycles, or kick scooters.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later. In one aspect of the present disclosure, a bicycle or scooter compression clamp adapted to bind a handlebar stem to a fork tube using a headset bearing such that the headset bearing can be preloaded via tightening of a compression mechanism, is provided, comprising: a longitudinal compression sleeve body; a first bore of a first diameter disposed at an end of the body, adapted for engaging the handlebar stem; a second bore of a smaller second diameter disposed at an other end of the body, adapted for engaging the fork tube, wherein the first bore and the second bore are substantially inline and coaxial to each other and meet within the body to form a circular lip defined by a difference in the first diameter and second diameter; a compression washer having a diameter greater than the second diameter, disposed upon the lip; a compression bolt with threads coupled to the compression washer, the threads within the second bore of the body; a gripping element adapted to couple to the threads of the compression bolt, such that as the compression bolt is tightened, the fork tube is axially pulled towards the compression washer to preload the headset bearing; a longitudinal slot along the entire body, providing a gap from the first and second bore to an exterior of the body; and a rotation preventing tightening mechanism disposed about a portion of the body on opposing sides of the longitudinal slot, such that as the tightening mechanism is tightened, the longitudinal slot is compressed and the handlebar stem and the fork tube are secured to the body and prevented from rotating separately from the body.

In another aspect of the above clamp, the body is manufactured with the compression washer integrally formed to the lip of the compression clamp and/or wherein the compression washer and bolt are integrally formed and/or wherein the tightening mechanism is a plurality of threaded bolts, secured through a plurality of holes traversing the longitudinal slot and/or wherein the first and second bore diameters are the same and the compression washer is interior and integral to the compression sleeve body; and/or further comprising a single longitudinal keyway slot disposed along a perimeter of the first and second bore, and being opposite to the longitudinal slot; and/or further comprising a key insertable into the keyway slot, having a first uniform thickness and a second uniform thickness, wherein an intersection of the first and second uniform thickness provides a horizontal edge approximate to the lip of the body, and the first and second uniform thicknesses are sized to mate a space between the keyway slot and respective fork tube and handlebar stem; and/or further comprising a semi-circular shim insertable into the first bore of the body; and/or wherein a portion of the compression sleeve body is formed from at least one of metal stock and a moldable material; and/or wherein the compression sleeve body's second bore is of a diameter of approximately 1 and ⅛ inches, the first bore is of a diameter of approximately 1¼ to 1⅜ inches, and the longitudinal slot gap is approximately ⅛ to ⅜ inches in width; and/or wherein the sleeve body is between 1 to 6 inches in length; and/or further comprising a handlebar stem and fork alignment mechanism using a set screw.

In another aspect of the present disclosure, a bicycle or scooter compression clamp adapted to bind a handlebar stem to a fork tube using a headset bearing such that the headset bearing can be preloaded via tightening of a compression mechanism, comprising: a longitudinal compression sleeve body; a first bore of a first diameter disposed at an end of the body, adapted for engaging the handlebar stem; a second bore of a smaller second diameter disposed at an other end of the body, adapted for engaging the fork tube using a headset bearing, wherein the first bore and the second bore are substantially inline and coaxial to each other and meet within the body to form a circular lip defined by a difference in the first diameter and second diameter; means for gripping, adapted to grip the fork tube, inserted into the second bore of the body; means for tightening coupled to the means for gripping, a head portion of the means for tightening resting on the circular lip, such that as the means for tightening is tightened it compresses the gripped fork tube towards the first bore of the body, thereby preloading the headset bearing of the fork tube; a longitudinal slot disposed along the entire body, providing a gap from the first and second bore to an exterior of the body; and means for rotation prevention and securing disposed about a portion of the body on opposing sides of the longitudinal slot, wherein as the means for rotation prevention and securing is tightened, the longitudinal slot is compressed and the handlebar stem and the inserted fork tube are secured to the body and prevented from rotating separately from the body.

In yet another aspect of the present disclosure, a bicycle or scooter clamping system binding a handlebar stem to a fork tube using a headset bearing such that the headset bearing can be preloaded via tightening of a compression mechanism is provided, comprising: a handlebar stem; a fork tube using a headset bearing; and a longitudinal compression sleeve body, comprising: a first bore of a first diameter disposed at an end of the body, engaging the handlebar stem inserted therein; a second bore of a second diameter disposed at an other end of the body, adapted for engaging the fork tube inserted therein, wherein the first bore and the second bore are substantially inline and coaxial to each other and meet within the body to form a circular lip defined by a difference in the first diameter and second diameter; a compression washer having a diameter greater than the second diameter, disposed upon the lip; a compression bolt with threads coupled to the compression washer, the body and the threads within the second bore of the body; a gripping element adapted to couple to the threads of the compression bolt, such that as the compression bolt is tightened, the fork tube is axially pulled towards the compression washer to preload the headset bearing; a longitudinal slot along the entire body, providing a gap from the first and second bore to an exterior of the body; and a rotation preventing tightening mechanism disposed about a portion of the body on opposing sides of the longitudinal slot, such that as the tightening mechanism is tightened, the longitudinal slot is compressed and the handlebar stem tubing and the fork tubing are secured to the body and prevented from rotating separately from the body.

In another aspect of the above system, the compression washer is integrally formed in the body; and/or wherein the compression washer and compression bolt are integrally formed.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings. As such, other aspects of the disclosure are found throughout the specification.

BRIEF DESCRIPTION OF THE DRAWINGS

The features and nature of the present disclosure will become more apparent from the detailed description set forth below when taken in conjunction with the drawings in which reference characters identify corresponding items and processes throughout.

FIGS. 3A-B are front and cross-sectional views of an exemplary coupling embodiment.

FIGS. 6A-C are perspective views of exemplary embodiments with varying number of attachment means.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

Figure 1:
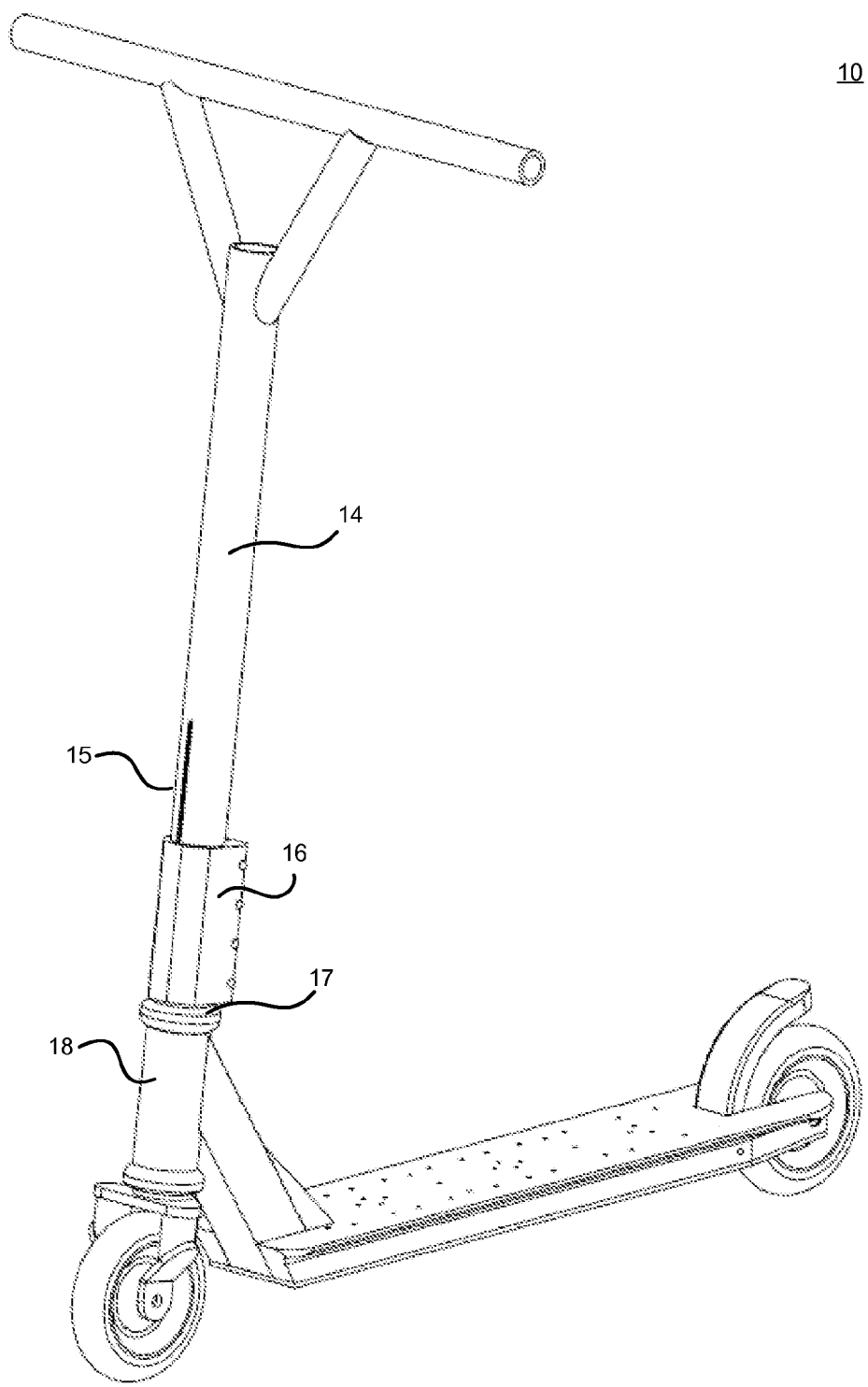
FIG. 1 is an illustration of a kick scooter with an exemplary coupling attached thereto.

FIG. 1 is an illustration of a freestyle kick scooter 10 with an exemplary compression coupling 16 attached thereto. An exemplary compression coupling 16 is externally mounted to a threadless stem-to-fork joint and spans a greater surface area of the stem 14 and fork (shown internal to head tube 18) resting on headset bearings 17. Handlebar alignment channel 15, as further described below, is shown on the bottom of stem 14. With more secured surface area, the exemplary coupling 16 provides a simple and robust coupling mechanism, enabling stunt activities to performed without fear of separation of the stem-to-fork joint. Various details of exemplary embodiments of the compression coupling 16 are expounded upon below.

Figure 2:
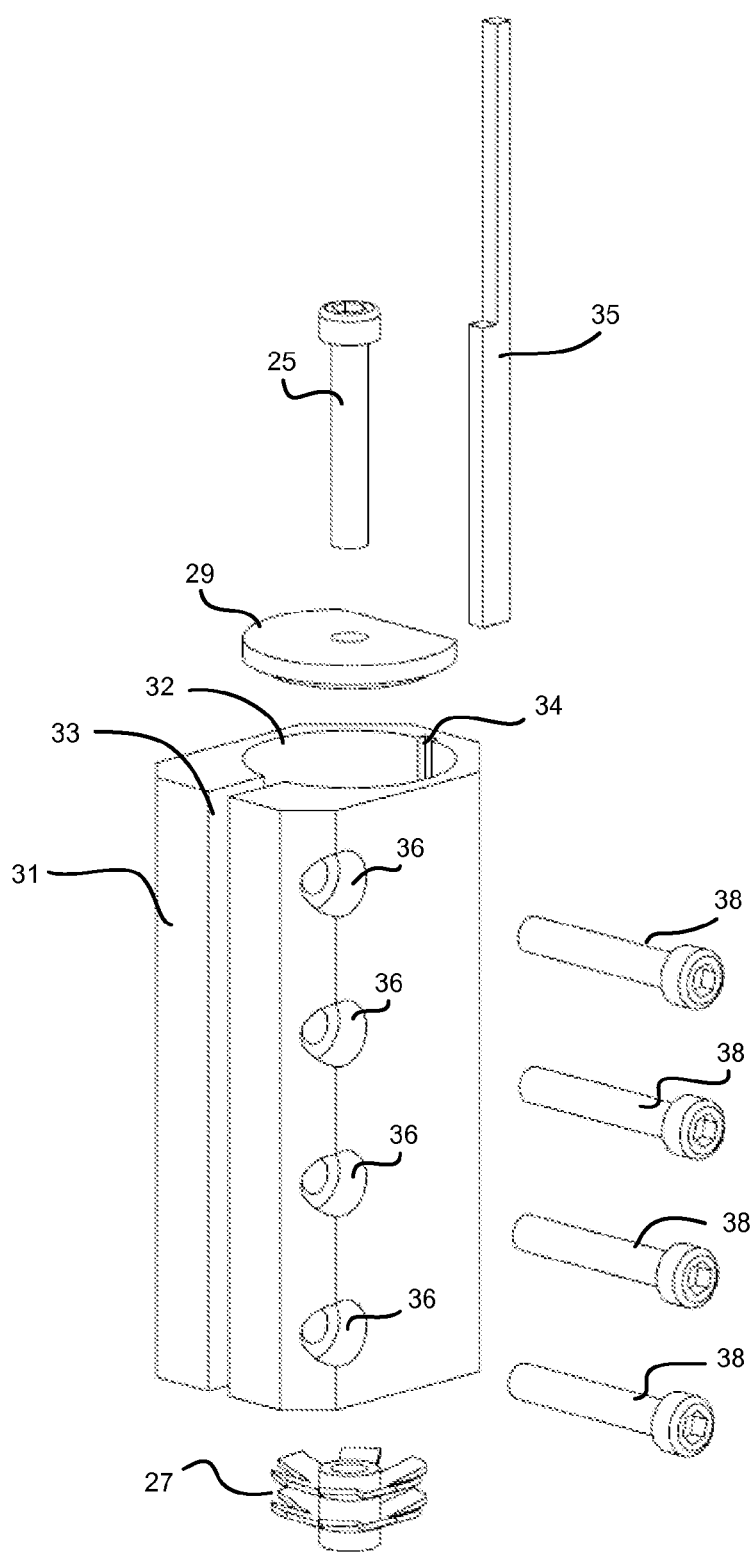
FIG. 2 is an expanded view illustration of an exemplary coupling embodiment.

FIG. 2 is an illustration of an expanded view of an exemplary compression coupler 20, having optional threaded compression bolt 25, compression washer 29 and threaded fork insert 27. The exemplary compression coupler 20 of this embodiment is shown as an open ended compression sleeve 31 having an inner opening 32 with an interior profile (not shown) of two different bore diameters for matching differently sized stem and fork tubing, and a compression accommodating gap 33. Optional keyway 34 is provided in opening 32 for an optional alignment key 35 to allow aligning the tubings, as further detailed below.

A series of bolts 38 for tightening the compression accommodating gap 33 of the exemplary compression coupler 20 are shown with matching holes 36 distributed along the axis of the compression sleeve 31. Though the bolts 38 are illustrated as having hexagonal keyed heads (e.g., Allen heads) for tightening (to nuts or threads, not shown) by a hexagonal wrench (e.g., Allen wrench), any bolt type/style or tightening mechanism may be used without departing from the spirit and scope of this disclosure. Accordingly, the bolts 38 may be screws, threaded, non-threaded, or any mechanism that provides a tightening capability. In some embodiments, after applying an arbitrary mechanism to tighten the compression accommodating gap 33, a rivet may be utilized to prevent the compression accommodating gap 33 from being "untightened."

FIG. 3A is a view of an exemplary compression coupler 20 attached to a stem 22 and fork 24 at a near mid-point of the exemplary compression coupler 20. FIG. 3B is a cross-sectional view along the cut line A-A of FIG. 3A, showing the different diameters of stem 22 and fork 24. The profile of the interior side of the exemplary compression coupler 20 is generally symmetric, whereas the right side is not visible due to cut line A-A being centered through optional keyway 34. However, if stem 22 and fork 24 are smaller in diameter than the inner bore diameters of the exemplary compression sleeve 20, an appropriately sized shim can be inserted, as detailed below.

Referring back to FIG. 1, in some scooters, a channel 15 of a predetermined depth will be longitudinally cut into the stem and the fork for use as handlebar alignment registration to align the stem (and by inference, the handlebars) with the fork. This handlebar alignment channel 15 is typically cut into the "front" of both the stem and fork. By aligning the optional keyway 34 with the handlebar alignment channel 15, the alignment key 35 can be placed into the handlebar alignment channel and into the aligned optional keyway 34, to constrain rotation of the stem from the fork, when the exemplary compression coupler 20 is tightened.

By use of an appropriately sized alignment key 35 in concert with optional keyway 34, the exemplary compression coupler 20 can be used to easily align a stem and fork tubing. Of course, in some embodiments, the optional keyway 34 or alignment key 35 may not be necessary, depending on the alignment mechanism provided in the stem and fork.

As shown, optional threaded compression bolt 25, compression washer 29 and threaded fork insert 27 can be utilized to further assist in restraining the exemplary compression coupler 20 to the fork 24. In operation, compression washer 29 is placed on top of a lip 30 formed by the junction of different bore holes in the exemplary compression clamp 20. The threaded compression bolt 25 is then engaged with the threaded fork insert 27 and tightened to cause expansion legs 27a of threaded fork insert 27 to be pulled against the fork 24, thus securing the exemplary compression clamp 20 (joined by threaded compression bolt 25 and compression washer 29) to fork 24 (joined by threaded fork insert 27).

It should be appreciated that while the threaded fork insert 27 is shown with expansion legs 27a, any lateral force inducing apparatus may be utilized. Therefore, modifications to the type of threaded fork insert 27 and associated elements are understood to be within the purview of one of ordinary skill in the art.

It is also understood that in most embodiments, an air gap of some sort between the compression washer 29 and the fork 24 is necessitated, to allow the fork 24 to freely move slightly upward as it is being engaged by the threaded fork insert 27, particularly for preloading purposes. Specifically speaking, the optional threaded compression bolt 25, compression washer 29 and threaded fork insert 27 can be used to "preload" the headset bearings 17 (see FIG. 1). By way of example, when the exemplary compression coupler 20 is fitted onto the scooter, the optional alignment key 35 can be used to keep all the components in line with each other. When the stem 22 is removed from the top bore hole of the exemplary compression coupler 20, the threaded compression bolt 25, compression washer 29 and threaded fork insert 27 can be inserted into the top bore of the exemplary compression coupler 20, with the compression washer 29 resting on a lip 30 formed by the junction of the two diameter bores in the exemplary compression coupler 20. Thereafter, the threaded compression bolt 25 can be tightened against the threaded fork insert 27 to cause the fork 24 to be pulled toward the compression washer 29, resulting in preloading the headset bearings 17 and removing undesired looseness from the headset bearings 17. Once the appropriate looseness is removed, the stem 22 can be placed into the top bore of the exemplary compression coupler 20 and tightened via the threaded bolts 38.

It should be appreciated that in some embodiments, it may be desirable to have the threaded compression bolt 25, compression washer 29 and threaded fork insert 27 fixed in the exemplary compression coupler 20. That is, rather than being an optional fixture, the compression washer 29 may be milled or fabricated as an integral, fixed part of the exemplary compression coupler 20, with the threaded compression bolt 25 and threaded fork insert 27 attached thereto. Therefore, where headset bearing loading is desired, in some embodiments the exemplary compression coupler 20 may come pre-configured with the compression washer 29.

In some embodiments, the compression washer 29 may not rest on a lip 30, but in an exemplary compression coupler 30 that has a single bore diameter throughout, be positioned at a near mid-point of the bore. Therefore, in this instance, without a lip 30 to rest on, the compression washer 29 may be fabricated to be integral to the exemplary compression coupler 30.

Figure 4B:
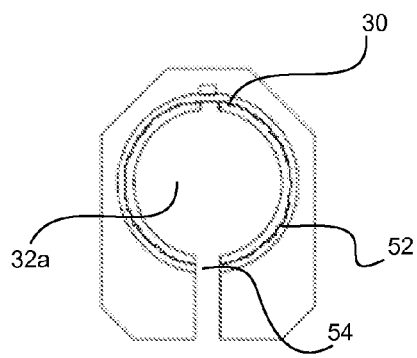
FIGS. 4A-E are left, top, right, bottom and front views of an exemplary coupling embodiment.
Figure 4A:
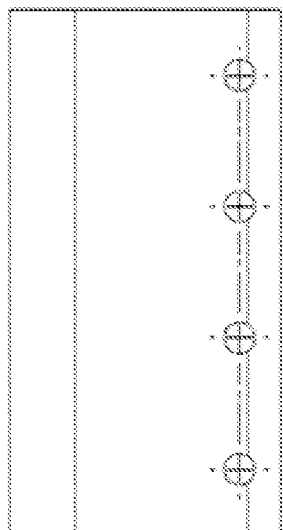
Figure 4E:
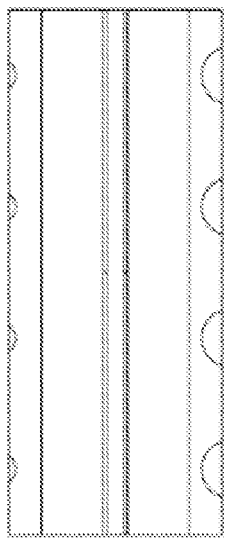
Figure 4C:
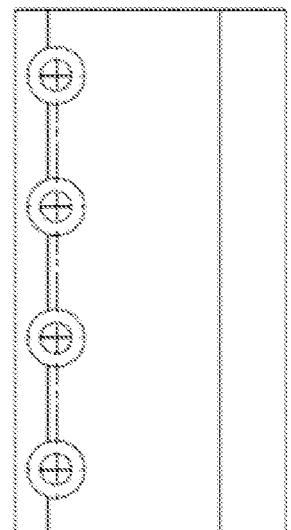
Figure 4D:
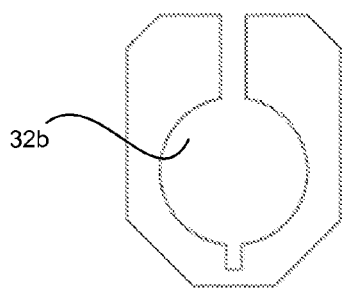

FIGS. 4A-4E are left, top, right, right, bottom and front views, respectively, of an exemplary compression coupler 20. In FIG. 4B an optional circular shim 52 is inserted into the top of inner opening 32a and resting on lip 30. Optional shim 52 provides a convenient mechanism to allow the exemplary compression coupler 20 to fit stem tubing that may be smaller in diameter than the respective bore of the exemplary compression coupler 20. Also, an appropriately sized shim (not shown) may be utilized on the bottom opening 32b (FIG. 4D), if so desired. Shim 52 is shown with gap 54 to allow the shim 52 to compress as the exemplary compression coupler 20 is tightened.

As evident in the bottom view, the opening 32b is of a smaller diameter than the opening 32a in the top view. This is consistent with the practice of scooter manufacturers using a larger tube size for the stem than the fork.

Figure 5A:
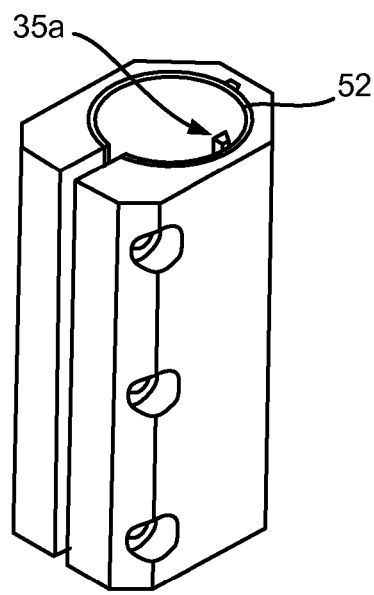
FIGS. 5A-C are perspective view, front and cut-away views of an exemplary embodiment.
Figure 5B:
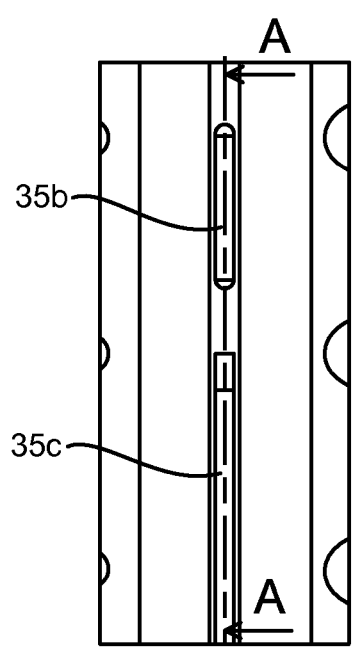
Figure 5C:
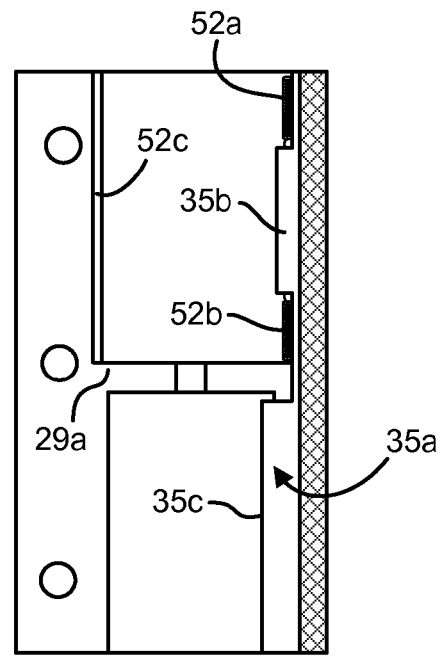

FIGS. 5A-C are perspective, front and cut-away views of additional embodiments of an exemplary compression coupler 20 having a built in compression washer 29a, with a shim 52 having a slot for a multi-extensioned alignment key 35a having extensions 35b and 35c. FIG. 5C illustrates the shim 52 with "upper" 52a and "lower" 52b cross sectional portions breeched by alignment key extension 35b, and cross sectional portion 52c opposite the alignment key 35a. The upper extension 35b of alignment key 35a can be used to align the stem while the lower extension 35c can be used to align the fork. These views illustrate the ability to craft a shim 52a with slots to allow alignment using the alignment key 35a, as well as the ability to have a compression washer 29a as an integral part of the exemplary compression coupler 20.

FIGS. 6A-C are elevated perspective views of additional embodiments of the exemplary compression coupler, each having a different number of holes for tightening the exemplary compression coupler. It is noted that FIG. 5B shows the optional shim 52 inserted. These views illustrate the ability to vary the number of holes/threaded bolts, if so desired. Accordingly, as different number of holes may be used, it is understood that a completely different mechanism for tightening/attachment, other than the use of threaded bolts or the like, may be contemplated as within the scope of this disclosure.

Figure 7:
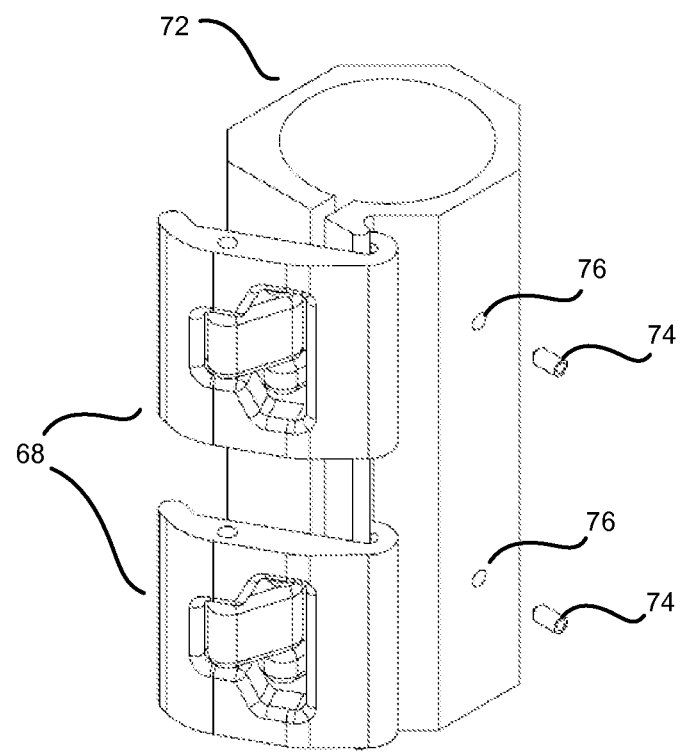
FIG. 7 is a perspective view of another exemplary embodiment with an attachment mechanism.

FIG. 7 is a perspective view of another exemplary compression coupler 70 showing various other types of applicable attachment mechanisms. One attachment mechanism is non-threaded and is shown as a set of pull-binding/releasable clasps 68. Though two pull-binding/releasable clasps 68 are shown, it is understood that more or less clasps may be implemented according to clasp design or binding strength preference. FIG. 6 also illustrates the use of threaded set screws 74 and set screw holes 76 as a mechanism for alignment, the number of which and position may be varied, as desired.

As is apparent, innumerable types and kinds of attachment mechanisms known to one of ordinary skill in the art can be utilized, either individually or in combination. As another example of a suitable attachment mechanism well known in the bicycle arts is a "quick release" axle. Other modifications may be contemplated including altering the positions of the attachment mechanisms, as well as modifying the shape or size of the body 72 of the exemplary compression coupler body.

In view of the disclosure provided above, various modifications may be made to the exemplary embodiments without departing from the spirit and scope therein. For example, it is contemplated that the compression sleeve may be a machined product or a molded product, or even a combination of the two, if so desired. Therefore, the exemplary compression sleeve may be formed from a metal and/or plastic material, fiberglass, carbon-based, and so forth, depending on design preference. In the interests of minimizing weight, the exemplary compression sleeve may be manufactured from aluminum stock or other light metal, or even a suitable plastic material. Also, the exemplary compression coupler may be varied in size, having a thinner profile, or shorter height, according to design preference.

In various embodiments for ready use with current kick style scooters, the exemplary compression coupler may be designed to have a height of approximately one to six inches with an internal bore diameter of approximately 1⅛ inches progressing approximately 50% of the depth of the exemplary compression coupler. The remaining depth of the exemplary compression coupler contains another internal bore having an approximate diameter of anywhere between 1¼ to 1⅜ inches. The gap of the exemplary compression coupler may be accomplished with a vertical slot of anywhere from ⅛ to ⅜ inches.

The above dimensions are provided to illustrate that the exemplary compression coupler can be fitted to current kick style scooters, according to the standard tube dimensions current used by industry. The above dimensions are therefore illustrative and do not represent all the possible dimensions that may be used, as the appropriate dimensions are principally a function of the tubing sizes found on a scooter. Therefore, while various descriptions are provided in the context of a kick scooter, the exemplary compression coupler may be used for other man-powered vehicles.

Accordingly, modification of the sizes may be made to accommodate the exemplary compression coupler to differently sized bicycle joints, as needed.

Also, it should be appreciated that while the various exemplary embodiments shown herein illustrate an interior profile of the exemplary compression coupler as having a "smooth" surface, non-smooth profiles or surfaces may be utilized without departing from the spirit and scope herein. For example, ridges, scoring, marking, and so forth may be applied to the interior profile of the exemplary compression coupler to provide an interior surface with increased gripping capabilities. Additionally, shim 52 may be differently sized, encompassing only a portion of the interior of the exemplary compression coupling.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used either the detailed description or the claims, such term is intended to be inclusive in a manner similar to the term "comprising" as "comprising" is interpreted when employed as a transitional word in a claim.

What is claimed is:

1. A bicycle or scooter compression clamp adapted to bind a handlebar stem to a fork tube using a headset bearing such that the headset bearing can be preloaded via tightening of a compression mechanism, comprising:
    a longitudinal compression sleeve body;
    a first bore of a first diameter disposed at an end of the body, adapted for engaging the handlebar stem;
    a second bore of a smaller second diameter disposed at an other end of the body, adapted for engaging the fork tube, wherein the first bore and the second bore are substantially inline and coaxial to each other and meet within the body to form a circular lip defined by a difference in the first diameter and second diameter;
    a compression washer having a diameter greater than the second diameter, disposed upon the lip;
    a compression bolt with threads coupled to the compression washer, the threads within the second bore of the body;
    a fork tube gripping element adapted to couple to the compression bolt and the fork tube inserted within the second bore of the body, such that as the compression bolt is tightened, the fork tube is axially pulled towards the compression washer to preload the headset bearing;
    a longitudinal slot along the entire body, providing a gap from the first and second bore to an exterior of the body; and
    a rotation preventing tightening mechanism disposed about a portion of the body on opposing sides of the longitudinal slot, such that as the tightening mechanism is tightened, the longitudinal slot is compressed and the handlebar stem and the fork tube are secured to the body and prevented from rotating separately from the body.

2. The compression clamp of claim 1, wherein the body is manufactured with the compression washer integrally formed to the lip of the compression clamp.

3. The compression clamp of claim 1, wherein the compression washer and bolt function as an integrally unit.

4. The compression clamp of claim 1, wherein the tightening mechanism is a plurality of threaded bolts, secured through a plurality of holes traversing the longitudinal slot.

5. The compression clamp of claim 1, further comprising a single longitudinal keyway slot disposed along a perimeter of the first and second bore, and being opposite to the longitudinal slot.

6. The compression clamp of claim 5, further comprising a key insertable into the keyway slot, having a first uniform thickness and a second uniform thickness, wherein an intersection of the first and second uniform thickness provides a horizontal edge approximate to the lip of the body, and the first and second uniform thicknesses are sized to mate a space between the keyway slot and respective fork tube and handlebar stem.

7. The compression clamp of claim 1, further comprising a semi-circular shim insertable into the first bore of the body.

8. The compression clamp of claim 1, wherein a portion of the compression sleeve body is formed from at least one of metal stock and a moldable material.

9. The compression clamp of claim 1, wherein the compression sleeve body's second bore is of a diameter of approximately 1 and ⅛ inches, the first bore is of a diameter of approximately 1¼ to 1⅜ inches, and the longitudinal slot gap is approximately ⅛ to ⅜ inches in width.

10. The compression clamp of claim 1, wherein the sleeve body is between 1 to 6 inches in length.

11. The compression clamp of claim 1, further comprising a handlebar stem and fork alignment mechanism using a set screw.

12. A bicycle or scooter compression clamp adapted to bind a handlebar stem to a fork tube using a headset bearing such that the headset bearing can be preloaded via tightening of a compression mechanism, comprising:
- a longitudinal compression sleeve body;
- a first bore of a first diameter disposed at an end of the body, adapted for engaging the handlebar stem;
- a second bore of a smaller second diameter disposed at an other end of the body, adapted for engaging the fork tube using a headset bearing, wherein the first bore and the second bore are substantially inline and coaxial to each other and meet within the body to form a circular lip defined by a difference in the first diameter and second diameter;
- means for gripping, adapted to grip a surface of the fork tube, inserted into the second bore of the body;
- means for tightening coupled to the means for gripping, a head portion of the means for tightening resting on the circular lip, such that as the means for tightening is tightened it compresses the gripped fork tube towards the first bore of the body, thereby preloading the headset bearing of the fork tube;
- a longitudinal slot disposed along the entire body, providing a gap from the first and second bore to an exterior of the body; and
- means for rotation prevention and securing disposed about a portion of the body on opposing sides of the longitudinal slot, wherein as the means for rotation prevention and securing is tightened, the longitudinal slot is compressed and the handlebar stem and the inserted fork tube are secured to the body and prevented from rotating separately from the body.

13. The compression clamp of claim 12, further comprising a single longitudinal keyway slot disposed along a perimeter of the first and second bore, and being opposite to the longitudinal slot.

14. The compression clamp of claim 13, further comprising a key insertable into the keyway slot, having a first uniform thickness and a second uniform thickness, wherein an intersection of the first and second uniform thickness provides a horizontal edge approximate to the lip of the body, and the first and second uniform thicknesses are sized to match a gap between the keyway slot and respective fork tube and handlebar stem.

15. A bicycle or scooter clamping system binding a handlebar stem to a fork tube using a headset bearing such that the headset bearing can be preloaded via tightening of a compression mechanism, comprising:
- a handlebar stem;
- a fork tube using a headset bearing; and
- a longitudinal compression sleeve body, comprising:
  - a first bore of a first diameter disposed at an end of the body, engaging the handlebar stem inserted therein;
  - a second bore of a second diameter disposed at an other end of the body, adapted for engaging the fork tube inserted therein, wherein the first bore and the second bore are substantially inline and coaxial to each other and meet within the body to form a circular lip defined by a difference in the first diameter and second diameter;
  - a compression washer having a diameter greater than the second diameter, disposed upon the lip;
  - a compression bolt with threads coupled to the compression washer, the threads within the second bore of the body;
  - a fork tube gripping element adapted to couple to the compression bolt and the fork tube inserted within the second bore of the body, such that as the compression bolt is tightened, the fork tube is axially pulled towards the compression washer to preload the headset bearing;
  - a longitudinal slot along the entire body, providing a gap from the first and second bore to an exterior of the body; and
  - a rotation preventing tightening mechanism disposed about a portion of the body on opposing sides of the longitudinal slot, such that as the tightening mechanism is tightened, the longitudinal slot is compressed and the handlebar stem and the fork tube are secured to the body and prevented from rotating separately from the body.

16. The clamping system of claim 15, wherein the compression washer is integrally formed in the body.

17. The clamping system of claim 15, wherein the compression washer and compression bolt function as an integrally unit.

* * * * *